(12) United States Patent
Chen et al.

(10) Patent No.: US 6,348,649 B1
(45) Date of Patent: Feb. 19, 2002

(54) SCALE INDICATOR FOR A KEYBOARD INSTRUMENT

(76) Inventors: Wei-Chih Chen, No. 135, Ssu-Chuan Rd., Taichung; Yao-Chuan Hu, No. 165, Min-Fu St., Ta-Ya Hsiang, Taichung Hsien, both of (TW)

( * ) Notice: Subject to any disclaimer, the term of this patent is extended or adjusted under 35 U.S.C. 154(b) by 0 days.

(21) Appl. No.: 09/788,396

(22) Filed: Feb. 21, 2001

(51) Int. Cl.⁷ .......................... G09B 15/02; G09B 15/08
(52) U.S. Cl. ..................... 84/477 R; 84/464 A; 84/473; 84/478; 84/479 A; 84/485 R
(58) Field of Search .......................... 84/464 R, 464 A, 84/462, 470 R, 471 R, 473, 475, 471 SR, 477 R, 478, 479 A, 485 R, 485 SR

(56) References Cited

U.S. PATENT DOCUMENTS 3,958,487 A * 5/1976 Goldman ..................... 84/478
4,040,324 A * 8/1977 Green .......................... 84/478
4,516,465 A * 5/1985 Kani ........................ 84/470 R

* cited by examiner

Primary Examiner—Marlon T. Fletcher
(74) Attorney, Agent, or Firm—Rosenberg, Klein & Lee

(57) ABSTRACT

A scale indicator has a key selecting device and multiple illuminating devices. The key selecting device is arranged on the keybed of the keyboard. The player can use the key selecting device to choose the musical key for the music that he or she wants to play. Each illuminating device is electrically connected to the key selecting device and corresponds to one of the keys of the keyboard instrument. The illuminating devices will show a note for the corresponding key after the player sets the key selecting device to a desired musical key. This can show the player the notes to which the keys of the keyboard respectively corresponded. To learn the keyboard instrument becomes easier.

14 Claims, 7 Drawing Sheets

SCALE INDICATOR FOR A KEYBOARD INSTRUMENT

BACKGROUND OF THE INVENTION

1. Field of the Invention

The present invention relates to a scale indicator, and more particularly to a scale indicator for a keyboard instrument to show the instrument player which key corresponds to which note.

2. Description of Related Art

A keyboard instrument like a piano has a keyboard with multiple keys for a user to strike the keys to play music. In general, the keys of the keyboard instrument include multiple white keys and black keys. Each key is associated with one note or tone on a scale like Do, Re, Mi and so on. However, each key of the keyboard does not correspond to the same note or tone in different musical keys. For example, when the musical key has changed from C major to D flat major or F sharp major, the key on the keyboard corresponding to the note or tone Do is also changed. The change of the positions of the notes is very complex for a new player. Consequently, the conventional keyboard without any indicating device is difficult for a new player to play in different musical keys.

To overcome the shortcomings, the present invention tends to provide a scale indicator to mitigate or obviate the aforementioned problems.

SUMMARY OF THE INVENTION

The main objective of the invention is to provide a scale indicator to indicate the player that each key of the keyboard corresponds to which scale. The scale indicator has a key selecting device and multiple illuminating devices. The key selecting device is arranged on the keybed of the keyboard. The player can use the key selecting device to choose the musical key that he or she wants to play. Each illuminating device is electrically connected to the key selecting device and corresponds to one of the keys of the keyboard instrument. Consequently, the illuminating device will show a note for the corresponding key after the player sets the key selecting device to a desired musical key. This can show the player which keys on the keyboard corresponded to which note. Learning the keyboard instrument becomes easier.

Other objects, advantages and novel features of the invention will become more apparent from the following detailed description when taken in conjunction with the accompanying drawings.

DETAILED DESCRIPTION OF PREFERRED EMBODIMENT

Figure 1:
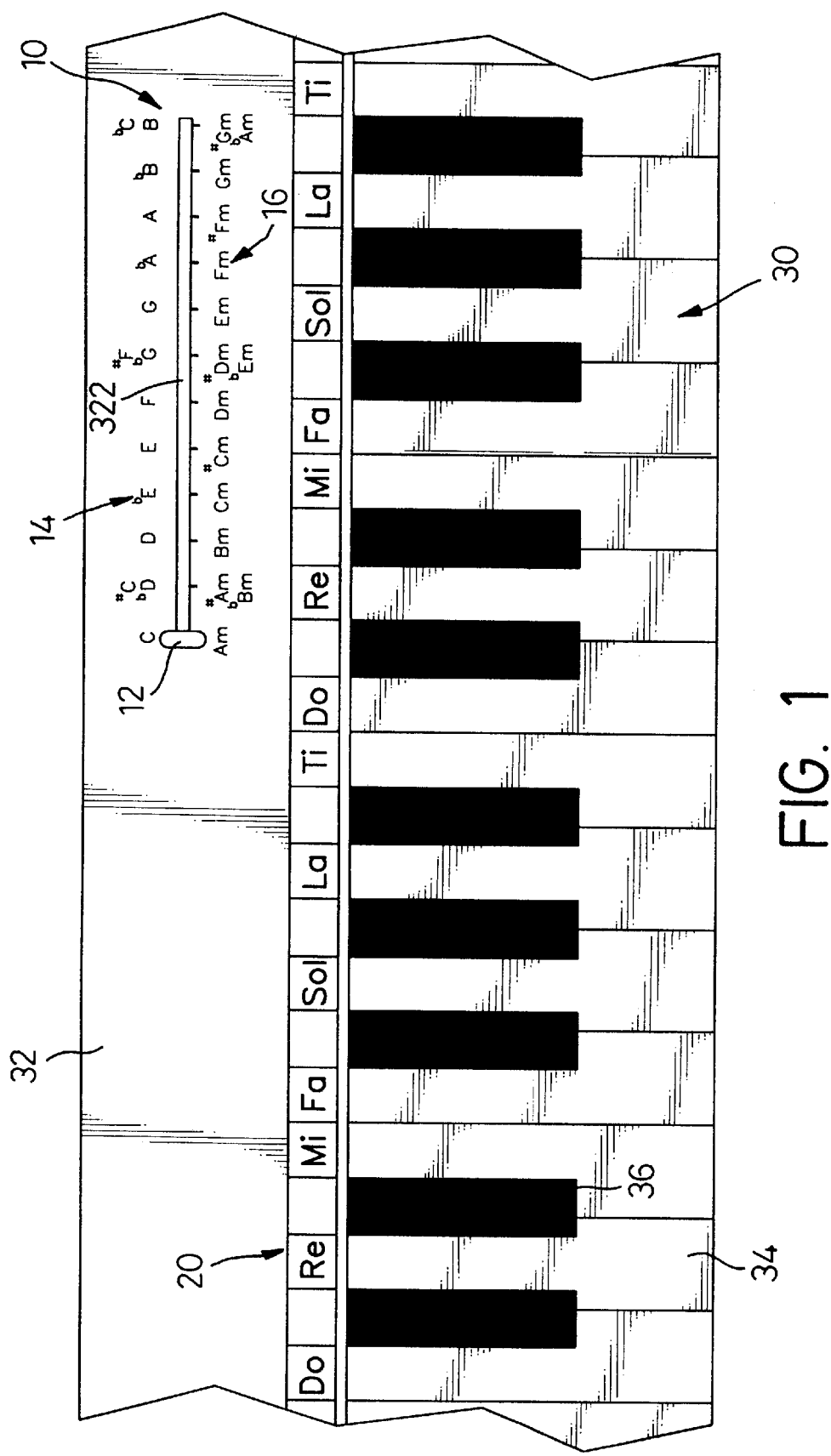
FIG. 1 is a schematic view of a keyboard with a scale indicator in accordance with the present invention showing the notes in C major key.

With reference to FIG. 1, a scale indicator in accordance with the present invention comprises a key selecting device (10) and multiple illuminating devices (20). The key selecting device (10) is mounted on the keybed (32) of a keyboard (30). The key selecting device (10) includes a knob (12) and a circuit board (not shown). The knob (12) is slidably mounted on the keybed (32) along a slot (322) defined in the keybed (32). A major key indicating area (14) is defined on the keybed (32) to show the major keys of music. A minor key indicating area (16) is defined on the keybed (32) to show the minor keys of the music. In practice, the major key indicating area (14) is located above the slot (322), and the minor key indicating area (16) is located below the slot (322). The circuit board (not shown) is mounted in the keybed (32) and electrically connected to the knob (12) and each illuminating device (20).

Each illuminating device (20) corresponds to one of the keys (34,36) of the keyboard (30). In a first embodiment, each illuminating device (20) is a liquid crystal display (LCD)(plasma, thin film transistor TFT), cold light display or the like to show the note of the corresponding key (34,36). Each illuminating device (20) is on the keybed (30) above the corresponding key (34,36).

When the knob (12) is pushed along the slot (322) to a position aligning with one of the musical keys indicated in the major key indicating area (14) or the minor key indicating area (14), each illuminating device (20) will show a note for the corresponding key (34,36). For example, with reference to FIG. 1, if a player wants to play a C major key, he or she pushes the knob (12) to align with the C major key indicated in the major key indicating area (14). Each illuminating device (20) will show a note corresponding to the key (34,36) above which the illuminating device (20) is mounted. Consequently, the player can strike the keys (34,36) according to the indication of the illuminating devices (20) to play notes in a C major key.

Figure 2:
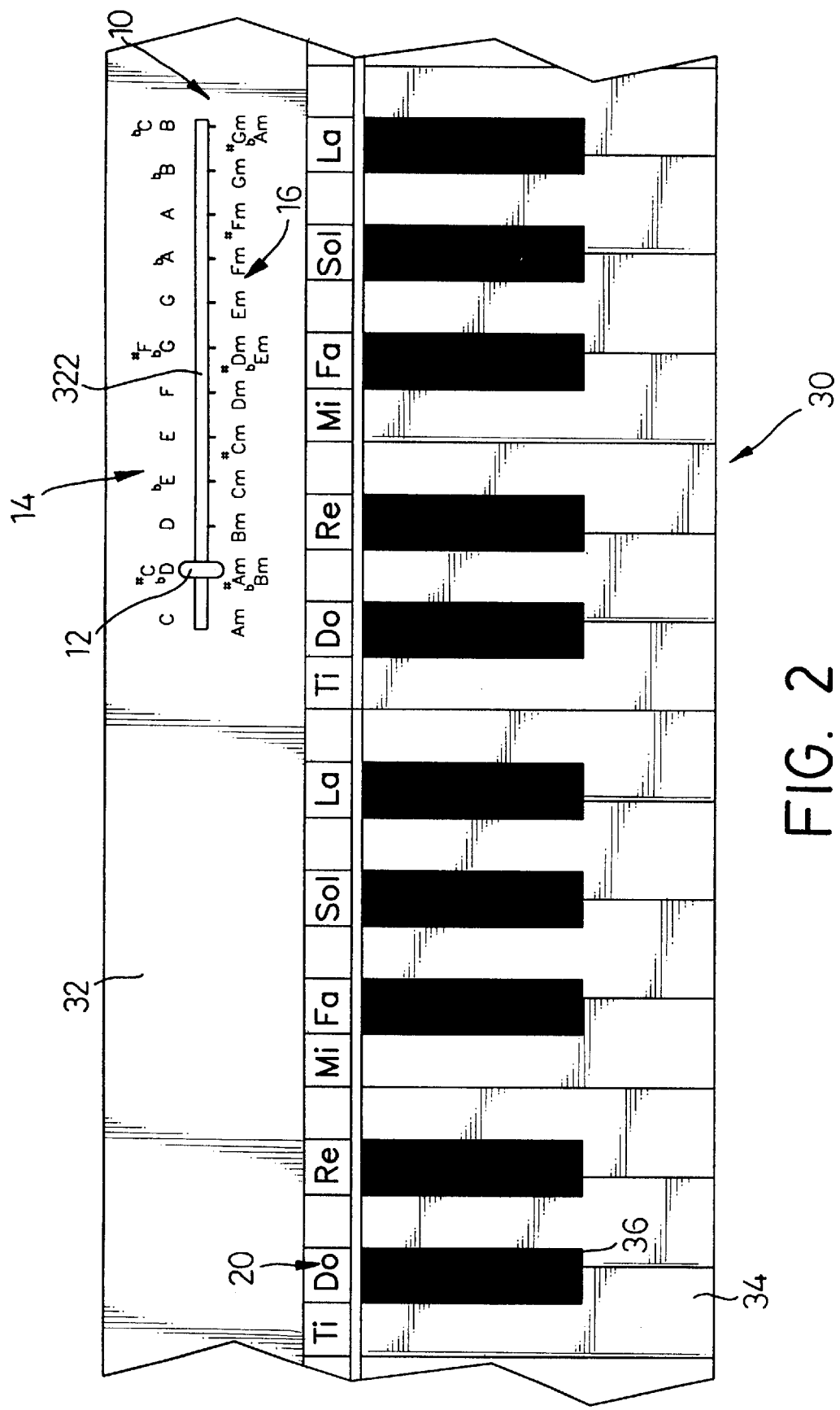
FIG. 2 is a schematic view of the keyboard with the scale indicator in FIG. 1 showing the notes in D flat major key or A sharp minor key.

With reference to FIG. 2, when the knob (12) is pushed along the slot (322) to a position aligning with the D flat major key or A sharp minor key. Each illuminating device (20) will show a note corresponding to the key (34,36) above which the illuminating device (20) is mounted. The player can strike the keys (34,36) according to the indication of the illuminating devices (20) to play notes in a D flat major key or A sharp minor key. Accordingly, a new player has an ability to correctly play music in different musical keys with the keyboard (30). To play the keyboard instrument becomes easier.

Figure 3:
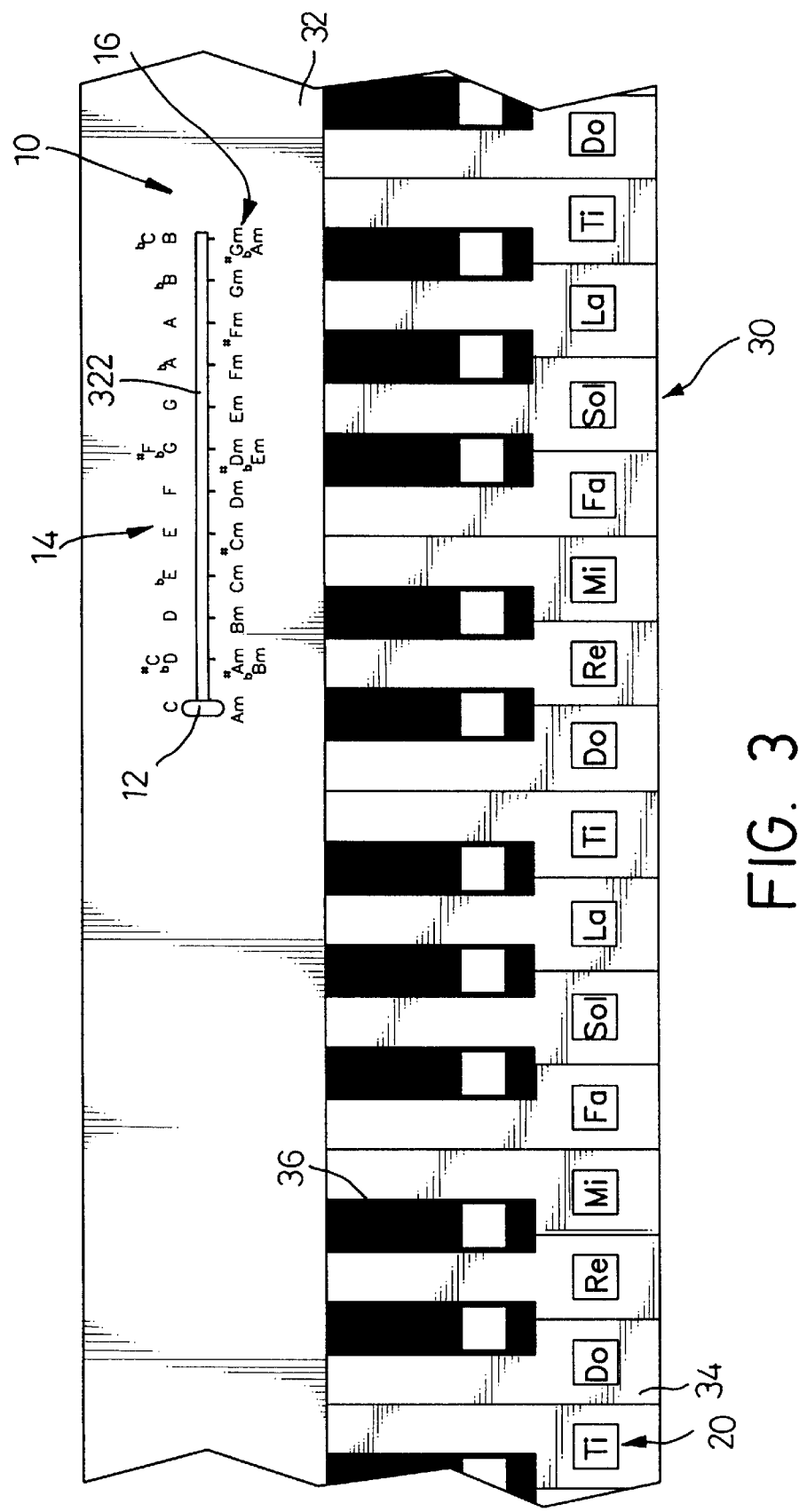
FIG. 3 is a schematic view of a keyboard with a second embodiment of a scale indicator in accordance with the present invention showing the notes in C major key.

With reference to FIG. 3, in a second embodiment of the scale indicator, each illuminating device (20) is mounted on the corresponding key (34,36).

Figure 4:
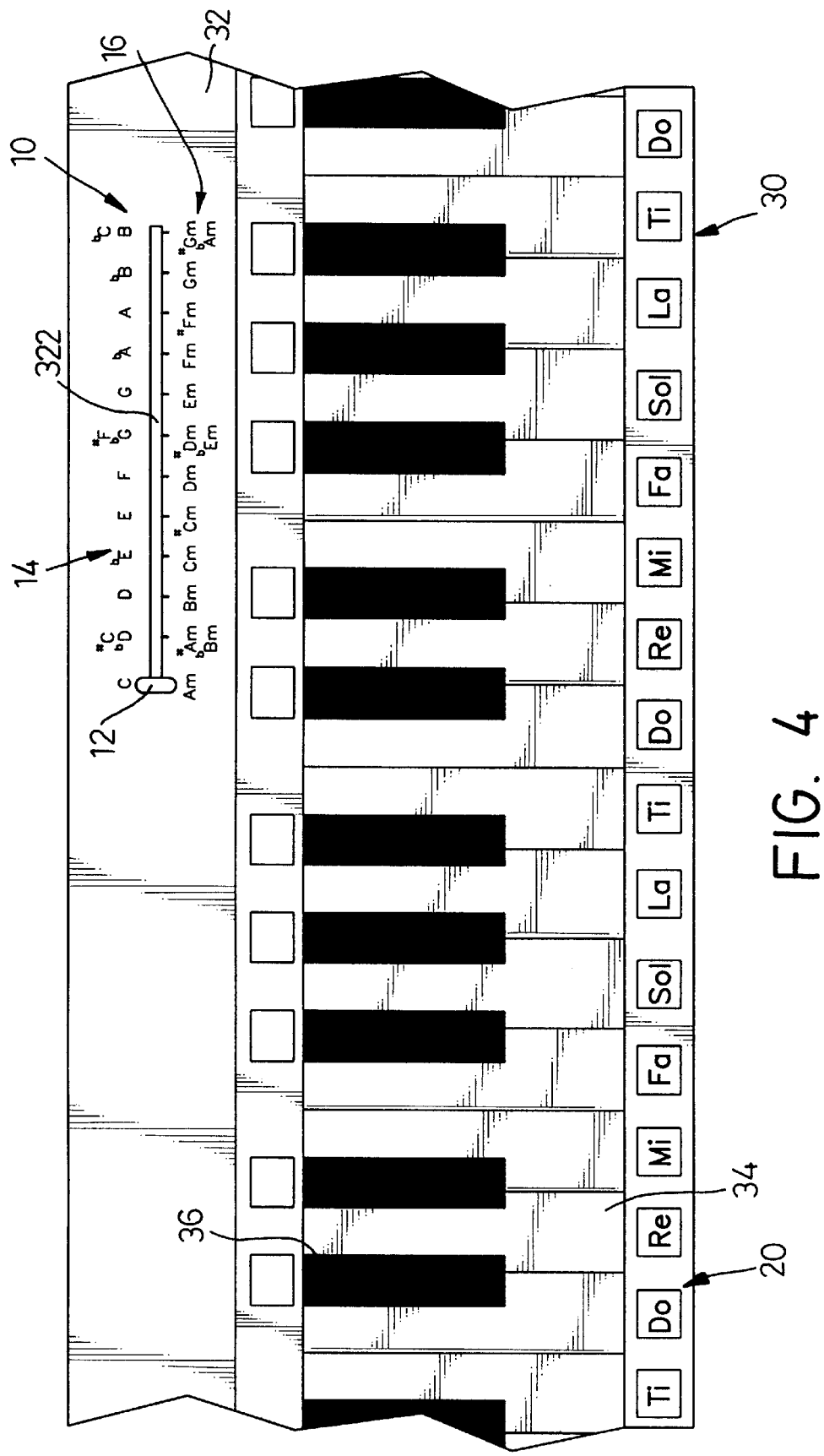
FIG. 4 is a schematic view of a keyboard with a third embodiment of a scale indicator in accordance with the present invention showing the notes in C major key.

With reference to FIG. 4, in a third embodiment of the scale indicator, each illuminating device (20) corresponding to the white key (34) of the keyboard (30) is mounted on the keybed (32) below the corresponding white key (34). Each illuminating device (20) corresponding to the black key (36) of the keyboard (30) is mounted on the keybed (32) above the corresponding black key (36). In a further embodiment, each illuminating device (20) is mounted on the keybed (32) below the corresponding key (34,36).

Figure 5:
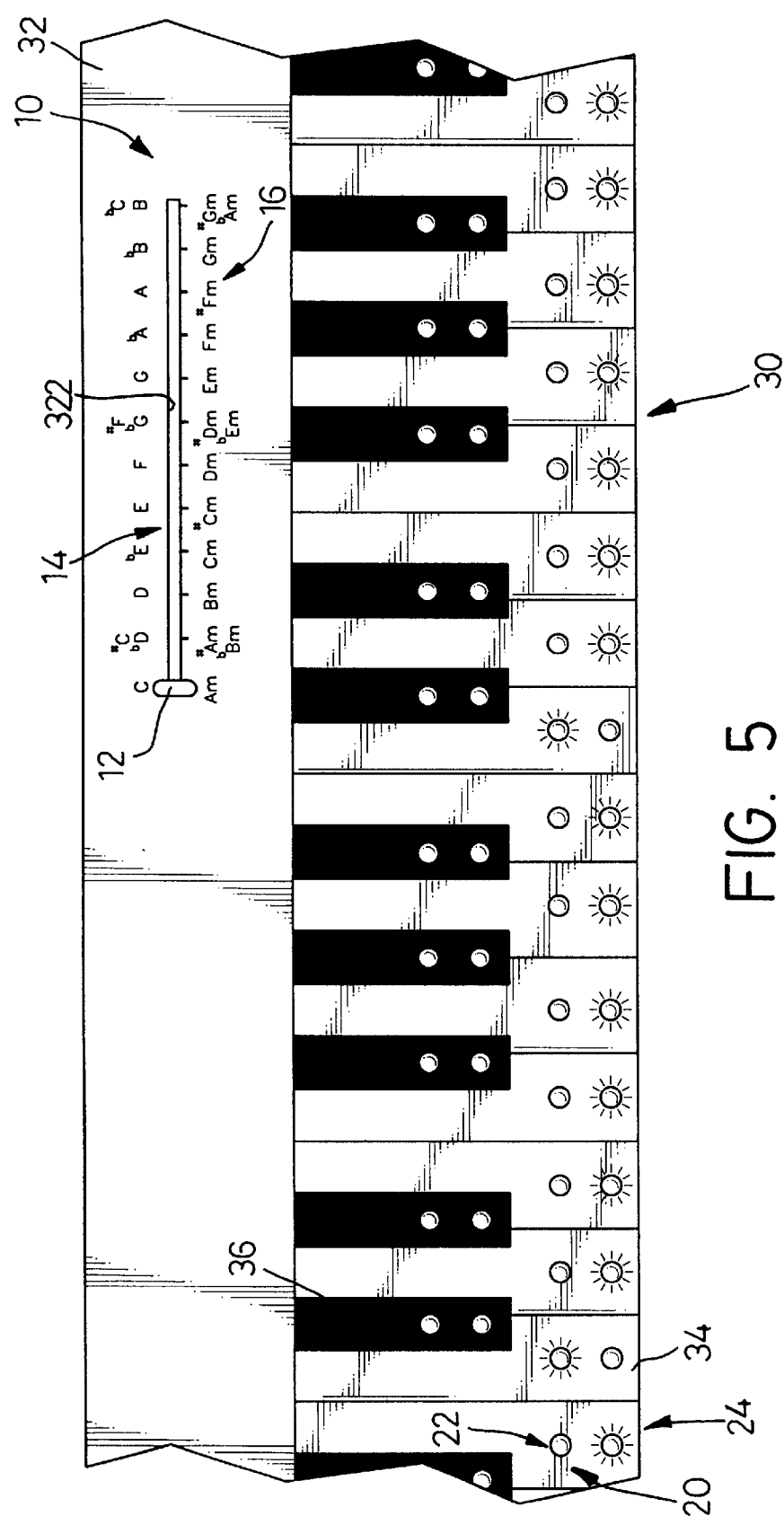
FIG. 5 is a schematic view of a keyboard with a fourth embodiment of a scale indicator in accordance with the present invention showing the notes in C major key.
Figure 6:
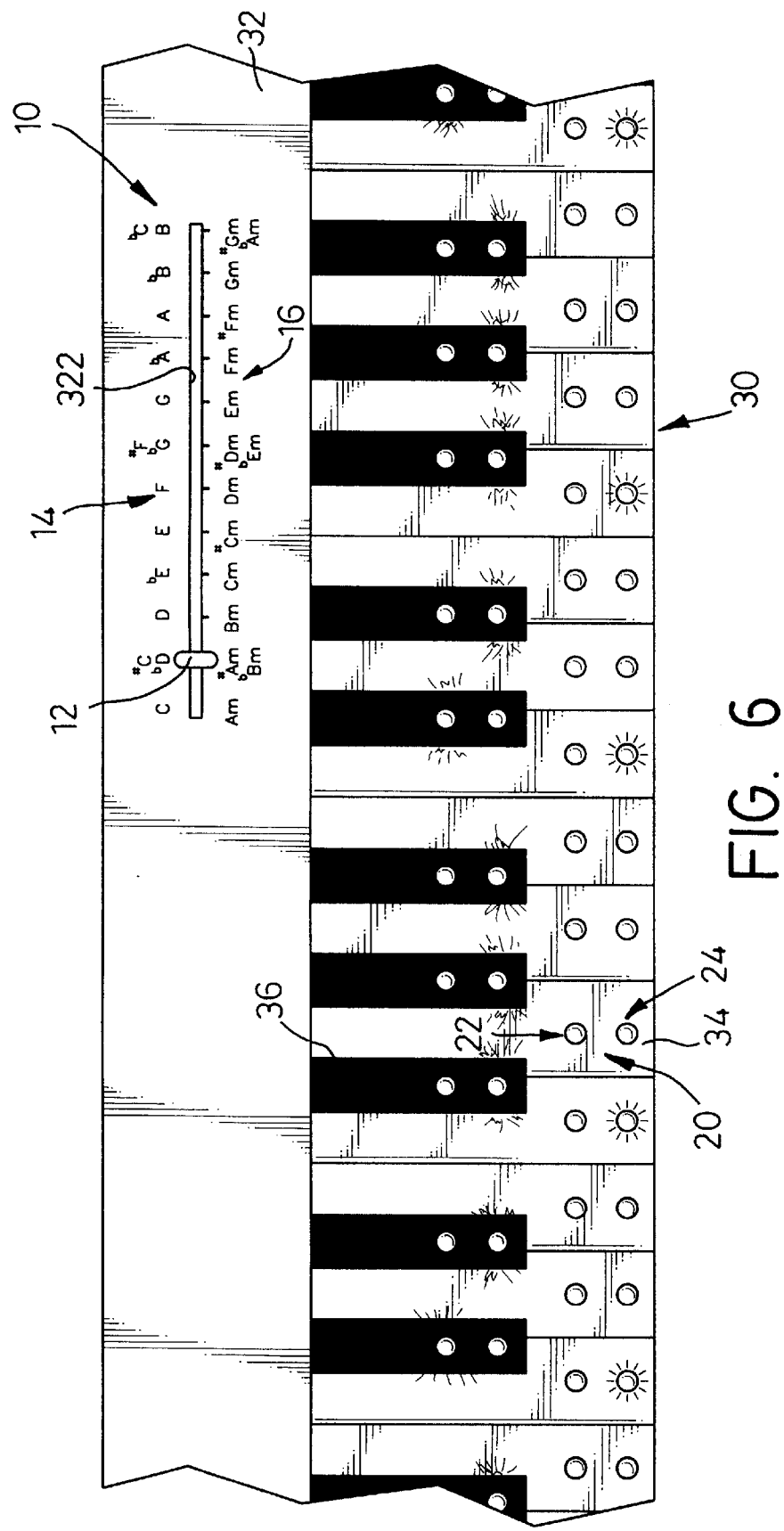
FIG. 6 is a schematic view of the keyboard with the fourth embodiment of the scale indicator in FIG. 5 showing the notes in D flat major key or A sharp minor key.

With reference to FIGS. 5 and 6, each illuminating device (20) includes two light emitting diodes (LED) (22,24), a first light emitting diode (22) and a second light emitting diode (24). The light emitting diodes (22,24) are mounted on the corresponding key (34,36) in a column. The two light emitting diodes (22,24) are different colors. The first light emitting diodes (22) is used to show the corresponding key (34,36) is at a Do note. The second light emitting diodes (24) is used to show the corresponding key (34,36) is another note.

When the player selects a musical key with the key selecting device (10), the first light emitting diode (22) of the illuminating device (20) corresponding to the key (34,36) which is the Do note will light. The second light emitting diode (24) of the illuminating device (20) corresponding to the key (34,36) which is not the Do note will light. Accordingly, the player can clearly distinguish which keys (34,36) of the keyboard are the Do note with the scale indicator.

Figure 7:
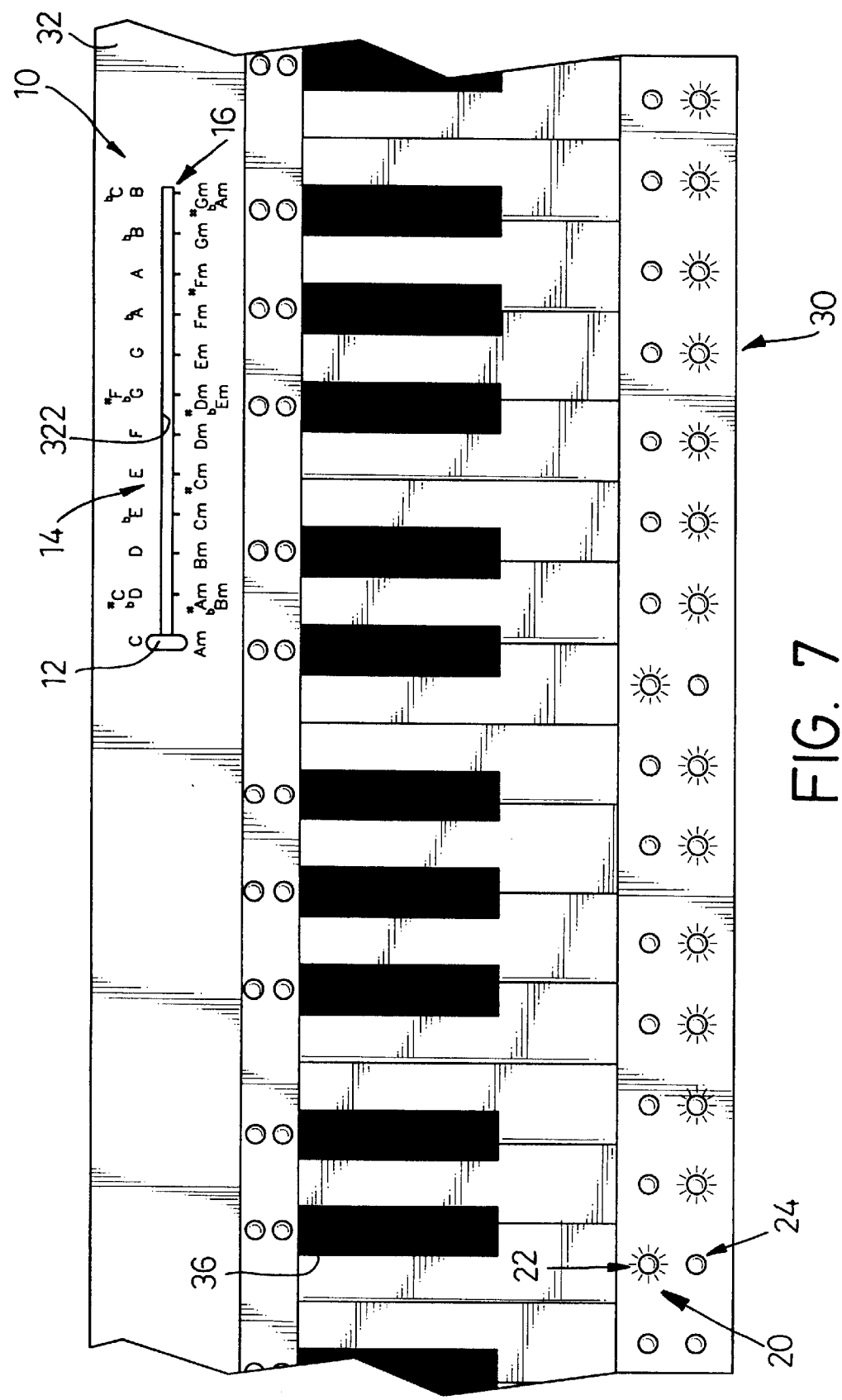
FIG. 7 is a schematic view of a keyboard with a fifth embodiment of a scale indicator in accordance with the present invention showing the notes in C major key.

With reference to FIG. 7, the light emitting diodes (22,24) of each illuminating device (20) corresponding to the white keys (34) of the keyboard (30) are mounted on the keybed (32) below the corresponding white key (34). The light emitting diodes (22,24) of each illuminating device (20) corresponding to the black keys (36) of the keyboard (30) are mounted on the keybed (32) above the corresponding black key (36).

In another embodiment of the scale indicator, the light emitting diodes (22,24) of each illuminating device (20) are mounted on the keybed (32) below the corresponding key (34,36), or the light emitting diodes (22,24) of each illuminating device (20) are mounted on the keybed (32) above the corresponding key (34,36).

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A scale indicator for a keyboard instrument having a keyboard, a keybed, and a plurality of white keys, and black keys mounted on said keybed, each of said white and black keys corresponding to different notes in different musical keys, the scale indicator comprising:
    a key selecting device positioned on said keybed, said key selecting device including a slot defined in said keybed, a plurality of musical key indicia positioned along said slot, and a knob slidable along said slot towards a respective one of said plurality of musical key indicia to select a musical key corresponding to said respective musical key indicium; and
    a plurality of illuminating devices, each permanently associated with a respective one of said white and black keys on said keybed, each said illuminating device being electrically connected to said key selecting device to indicate which musical note said respective one of said white and black keys corresponds to in said selected musical key.

2. The scale indicator as claimed in claim 1, wherein said key selecting device further includes a circuit board mounted in said keybed and electrically connecting said knob and said each illuminating device.

3. The scale indicator as claimed in claim 1, wherein said plurality of musical key indicia includes a major key indicating area defined on said keybed above said slot to indicate major musical keys.

4. The scale indicator as claimed in claim 1, wherein said plurality of musical key indicia includes a minor key indicating area defined on said keybed below said slot to indicate minor musical keys.

5. The scale indicator as claimed in claim 1, wherein each of said illuminating devices includes a liquid crystal display (LCD).

6. The scale indicator as claimed in claim 5, wherein each said illuminating device is mounted on said respective key.

7. The scale indicator as claimed in claim 5, wherein each said illuminating device is mounted on said keybed below said respective key.

8. The scale indicator as claimed in claim 5, wherein each said illuminating device is mounted on said keybed above said respective key.

9. The scale indicator as claimed in claim 5, wherein each said illuminating device associated with said respective white key is mounted on said keybed below said respective white key; and
    wherein each said illuminating device associated with said respective black key is mounted on said keybed above said respective black key.

10. A scale indicator for a keyboard instrument having a keyboard with multiple white keys, black keys and a keybed for mounting the white keys and black keys, the scale indicator comprising;
    a key selecting device mounted on the keybed; and
    a plurality of illuminating devices, each illuminating device being electrically connected to said key selecting device and positioned in correspondence with a respective key of the keyboard instrument, each illuminating device indicating a musical note associated with said corresponding key, wherein said each illuminating device includes two light emitting diodes of different colors,
    one of said two light emitting diodes indicating a Do musical note, and
    the other light emitting diode of said two light emitting diodes indicating a different musical note.

11. The scale indicator as claimed in claim 10, wherein the light emitting diodes of each of the illuminating devices are adapted to be mounted on the corresponding key in a column.

12. The scale indicator as claimed in claim 10, wherein each of the illuminating devices is adapted to be mounted on the keybed below the corresponding key.

13. The scale indicator as claimed in claim 10, wherein each of the illuminating devices is adapted to be mounted on the keybed above the corresponding key.

14. The scale indicator as claimed in claim 10, wherein each illuminating device corresponding to a white key of the keyboard is adapted to be mounted on the keybed below the corresponding white key; and
    each illuminating device corresponding to a black key of the keyboard is adapted to be mounted on the keybed above the corresponding black key.

* * * * *